United States Patent Office 3,703,478
Patented Nov. 21, 1972

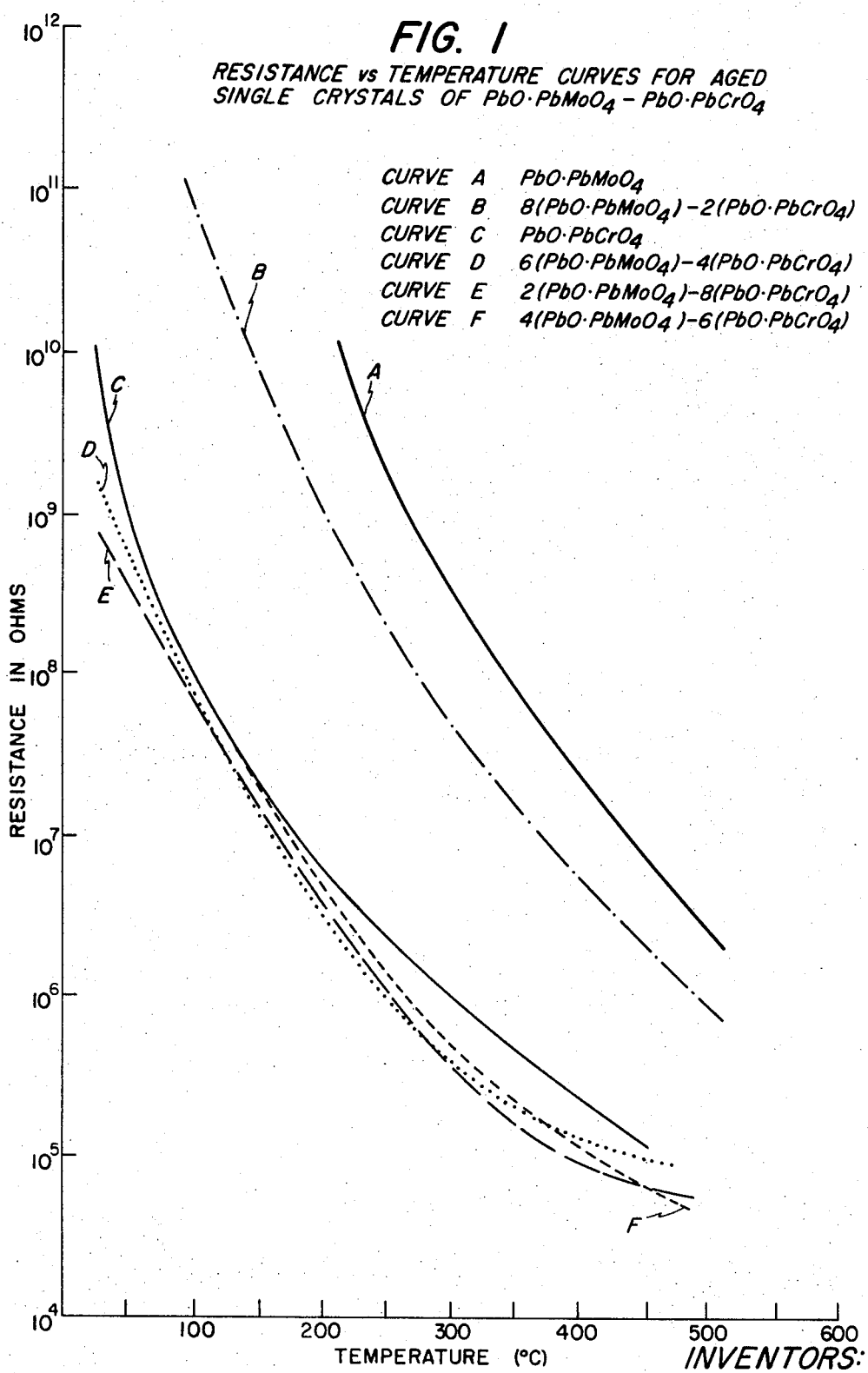

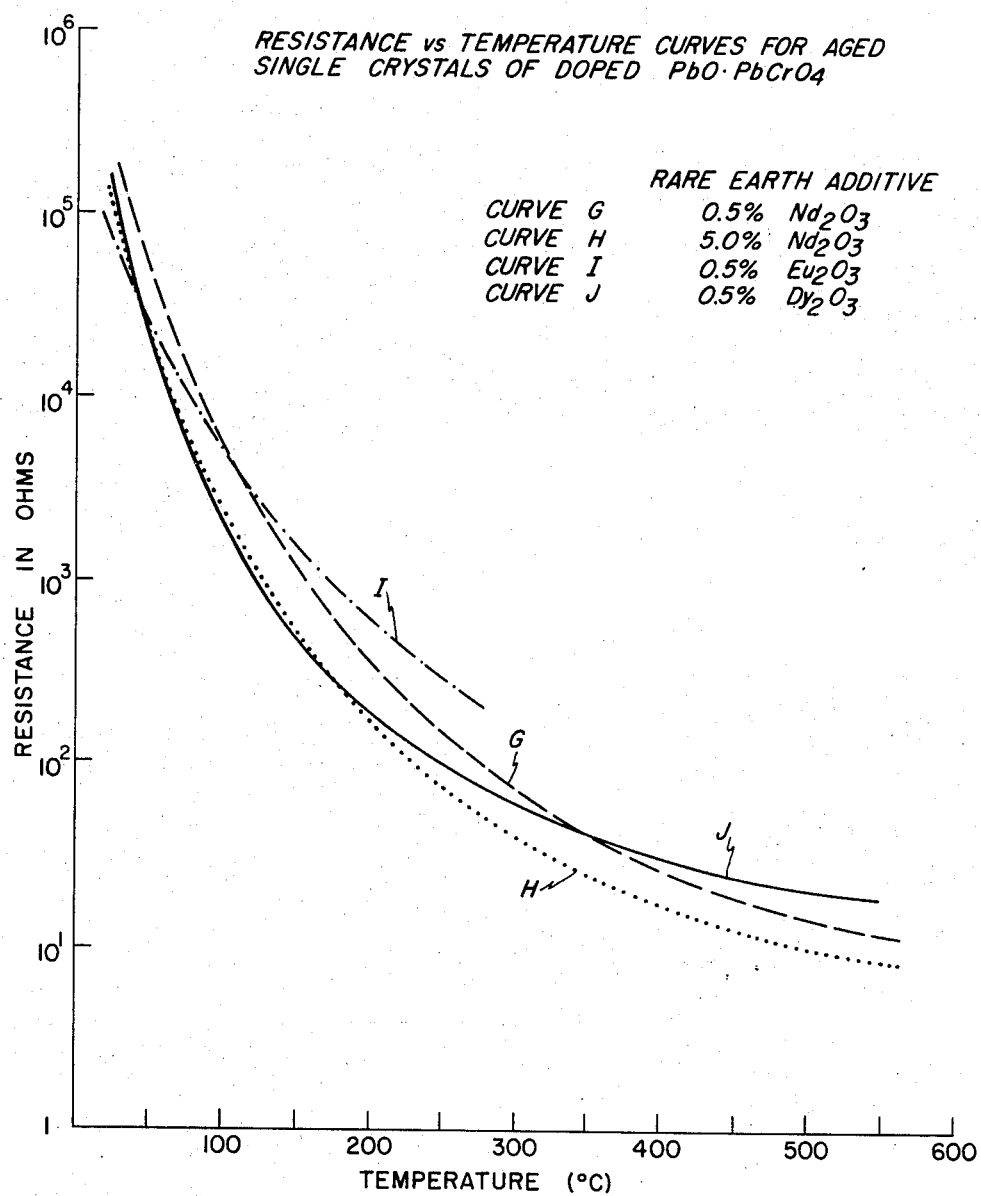

3,703,478
THERMISTORS
Robert C. De Vries, Burnt Hills, and James F. Fleischer, Scotia, N.Y., assignors to General Electric Company
Filed July 1, 1971, Ser. No. 158,802
Int. Cl. H01c 7/04; H01b 1/08
U.S. Cl. 252—521                                             11 Claims

ABSTRACT OF THE DISCLOSURE

Thermistors are provided in which the thermally sensitive semiconducting material consists essentially of a compound having the formula:

$$PbO \cdot PbZ''O_4$$

wherein $Z''$ is a member selected from the group consisting of chromium, molybdenum, and mixtures thereof, and 0.05–5.0 mole percent of a compound having the formula $M_2O_3$, wherein M is a member selected from the group consisting of scandium, yttrium, and the rare earth elements. The thermistor device can be made by dipping two closely spaced electrical conductors into a melt of the thermally sensitive semiconducting material to form an element of the material between the conductors.

---

Thermistors are semiconducting devices having electrical conductivities between those of conductors and insulators. The term "thermistors" is derived from thermally sensitive resistors, since the resistance of a thermistor varies rapidly with temperature. In recent years temperature measurements with semiconducting, thermally sensitive resistors have become increasingly widespread. A discussion of such devices is given by E. C. Robertson et al., Properties of Thermistors Used in Geothermal Investigations and by R. Rasbet et al., Preparation of Thermistor Cables Used in Geothermal Investigations, Geological Survey Bulletin 1203–B, C, U.S. Government Printing Office, Washington (1966).

The advantages of thermistors over resistance thermometers and the thermocouple is described by C. R. Droms, Thermistors for Temperature Measurements, in Am. Inst. Physics, Temperature, Its Measurement and Control in Science and Industry, New York, Reinhold, v. 3, part 1, pages 339–346. The semiconducting materials used in the latter report were the oxides of nickel, manganese, and cobalt.

Our copending application, Ser. No. 155,949 (filed about June 22, 1971), and assigned to the assignee of the present invention, discloses a thermistor device comprising electrical current leads and a thermally sensitive semiconductor material having the formula:

$$PbO \cdot PbZO_4$$

wherein Z is a member selected from the group consisting of chromium, molybdenum, tungsten, sulfur and mixtures thereof. The resistance versus temperature curves for the $PbO \cdot PbCrO_4$–$PbO \cdot PbMoO_4$ systems, which are shown in the drawing discussed below, indicate that the room temperature resistance is high, i.e. on the order of $10^9$ ohms and greater.

Quite surprisingly, we have discovered that the addition of the oxides of scandium, yttrium and the rare earth elements have a marked effect on lowering the resistivity of the $PbO \cdot PbCrO_4$, $PbO \cdot PbMoO_4$, or mixtures thereof. Thus, the room temperature resistance can be reduced up to about four orders of magnitude over the undoped single crystals.

In accordance with the present invention, we have discovered an improved thermistor device comprising electrical current leads and a thermally sensitive semiconducting material consisting essentially of a compound having the formula:

$$PbO \cdot PbZ''O_4$$

wherein $Z''$ is a member selected from the group consisting of chromium, molybdenum and mixtures thereof and 0.05–5.0 mole percent of a compound having the formula:

$$M_2O_3$$

wherein M is a member selected from the group consisting of scandium, yttrium, and a rare earth element. The thermistor device can be made in any conventional shape, but for rapid responses, it is usually made as small beads, discs or rods. When used as temperature sensing devices, the novel thermistors have a negative coefficient of resistances and can be made from both polycrystalline materials and from single crystals.

The invention is more clearly understood from the following description taken in conjunction with the accompanying drawing in which:

FIG. 1 illustrates the semiconducting properties of undoped compounds of the formula $PbO \cdot PbZ''O_4$;

FIG. 2 illustrates the semiconducting properties of compounds of the formula $PbO \cdot PbZ''O_4$ doped with compounds of the formula $M_2O_3$.

Referring to FIG. 1, the resistances in ohms of the semiconducting materials made from approximately rectangular single crystals cleaved with two opposite sides parallel and having a thickness of 0.5–1.0 mm. are shown at various temperatures for single compounds: Curve A—$PbO \cdot PbMoO_4$ and Curve C—$PbO \cdot PbCrO_4$; and for mixtures of these compounds: Curves B, D, E and F. These curves indicate that the thermistors have a negative coefficient of resistance and that the resistivity of the $PbO \cdot PbCrO_4$ compound is substantially lower than the $PbO \cdot PbMoO_4$ compound. With regard to the mixtures, the addition of $PbO \cdot PbCrO_4$ reduces the resistivity of the $PbO \cdot PbMoO_4$ (see Curve B) until a point is reached at which the mixture of $PbO \cdot PbMoO_4$–$PbO \cdot PbCrO_4$ (Curves D, E and F) results in producing curves which are substantially similar to the pure $PbO \cdot PbCrO_4$ (Curve C).

In FIG. 2, the resistance properties of rectangular single crystals similar to those described in FIG. 1 made from $PbO \cdot PbCrO_4$ and modified by doping with rare earth oxides are shown as a function of temperature. This indicates the marked effect of adding small amounts of trivalent rare earth ions. Thus the room temperature resistance is about four orders of magnitude less than for the undoped single crystal. Curves G and H show the effect of adding $Nd_2O_3$ in an amount of 0.5 mole percent and 5.0 mole percent respectively. The addition of 0.5 mole percent $Eu_2O_3$ is shown in Curve I and the addition of 0.5 mole percent $Dy_2O_3$ is shown in Curve J. The decrease in resistance of the doped element as compared to the undoped element is readily apparent when the curves of FIG. 2 are compared to Curve C of FIG. 1.

The thermally sensitive semiconductor element is made from $PbO \cdot PbCrO_4$, $PbO \cdot PbMoO_4$ or mixtures thereof. The sulfur and tungsten analogs individually, which were found useful in making the thermistors disclosed in our copending application cited above, did not show a significant reduction in resistance when doped with the rare earth oxides. Even when the sulfur or tungsten analogs were mixed with $PbO \cdot PbCrO_4$, the rare earth additions do not apreciably lower the resistance. Thus, while rare earth addition to the sulfur and tungsten analogs may have some uses, it does not show the kind of unusual properties to which the present invention is directed.

The addition of small amounts of compounds of the formula $M_2O_3$ wherein M is scandium, yttrium or a rare earth element substantially reduces the resistivity of the semiconducting element. The rare earth elements are also known as the "lanthanide series" and include the elements having the atomic numbers from 57–71. Similarities also exist between the transition metals of Group III–B of the Periodic Table which includes scandium, yttrium and lanthanum which are highly electropositive. The preference of one additive over another member of the group is a matter of choice and can be determined by routine experimentation. Furthermore, the oxides which are more readily available and less expensive are preferred. The amount of the additive $M_2O_3$ which is useful in our invention is in the range of 0.05–5.0 mole percent. An excess of 5.0 mole percent does not produce any further appreciable reduction in the resistance; while decreasing the amount to less than 0.05 mole percent is considered to be impractical because of processing difficulties, even though some reduction in resistance may occur.

The role of the rare earths (which also includes scandium and yttrium) in further increasing the conductivity of the semiconducting materials is not fully understood because the exact mechanism of the combined substitution and induced valence change or defect structure change is not yet defined. In general, there are two suggested ways of increasing conductivity: (1) to increase the number of carriers; and (2) to increase their mobility. Both may occure in the rare earth-doped materials. The room temperature darkening of the chromate by these additions is visually equivalent to the darkening that occurs on heating the undoped chromate above room temperature. The accompanying lowering of resistivity has been demonstrated. This observation suggests that the number of available electrons is increased in some way by the rare earth addition. The mobility of the electrons through the lattice may also be increased by the formation of a defect structure, i.e. some unoccupied lattice sites, which results from the type of substitution represented by $2M^{3+} = 3Pb^{2+}$. Increased conductivity frequently accompanies defect structures in the solid state.

Since basic lead chromate melts at a temperature of about 928° C. in air and is easily contained in platinum crucibles without attack of the platinum, one can solidify a polycrystalline bead onto wires by rapid withdrawal of the wires from the melt. Casting into molds is another way of making the beads. Units of varying bead sizes from about 0.5 to 3 mm. can be made by the wire-dipping technique. Bead size can be increased by repeated immersion of the bead. Silver, gold and platinum are useful as lead wires for the solidified beads.

Single crystals of doped basic lead chromate can be pulled from the melt with relative ease. The details of the chemistry of systems with extensive solid solution and of the crystal growth process have been reported by R. C. De Vries, et al., Phase Equilibria and Crystal Growth in the Systems $PbO \cdot PbCrO_4-PbO \cdot PbMoO_4$, $PbO \cdot PbCrO_4-PbO \cdot PbWO_4$ and $$PbO \cdot PbCrO_4-PbO \cdot PbSO_4$$

Mat. Res. Bull., vol. 5, pages 87–100 (1970). The important result is, that not only can single crystals of basic lead chromate be grown, but extensive solid solutions in which molybdenum, tungsten and sulfur are substituted for chromium can also be made. In preparing specimen for electrical measurements, units were made from roughly rectangular pieces of single crystals cleaved with two opposite sides parallel, the thickness between parallel cleavage surfaces of different crystals ranging from 0.5 mm. to 1.0 mm. and each surface to which electrical contact was made was about 4–9 $mm.^2$.

In making the novel thermistors of the present invention, various methods can be used for making 2-point electrical contacts. These include, for example, (1) simple pressure contact with gold foil against as-cleaved surfaces of the crystal; (2) simple pressure contact of gold foil against a vapor deposited gold or silver coating on cleaved crystal surface; (3) leads attached to gold or silver coatings by means of silver paste bonding material; and (4) soldering of gold or silver leads to crystals by means of gold-germanium alloy preforms.

As is well known in the art of making thermistors, the semiconducting element of the present invention can be encapsulated in conventional protective materials, such as polymeric materials, glasses and ceramics.

Our invention is further illustrated by the following examples:

EXAMPLE I

A $PbO \cdot PbCrO_4$ thermistor containing 0.5 mole percent $La_2O_3$ was made by the following techniques. Powders of 37.755 grams of reagent grade PbO and 54.672 grams of reagent grade $PbCrO_4$ and 0.277 gram of reagent grade $La_2O_3$ were mixed and then melted together in a platinum crucible at about 1,000° C. Two gold wires about 0.5 mm. thick and 5 cm. long and spaced about 1.0 mm. apart, were immersed into the melt to a depth of 2–3 mm. Upon withdrawal of the wires from the melt, a droplet which was cooled to a solid bead adhered to the closely spaced wires.

The resistance of the bead and wire unit was then measured as a function of temperature. This was accomplished by attaching the unit to two wires which were placed into a 4-hole ceramic thermocouple protection tube. The other two holes in the tube held a thermocouple which could be fixed in a position within 1–2 mm. of the bead unit. This entire unit was lowered into a tube furnace of the resistance heating type in which the temperature could be controlled to ±2° C. The wires supporting the bead unit were attached to a vacuum tube voltmeter or a resistance bridge or a megohm bridge. The vacuum tube voltmeter was standardized before each reading against known resistances. Resistance readings were taken at a series of temperatures determined from the thermocouple. Final readings were taken after the furnace temperature had equilibrated at the desired temperature. The room temperature resistance of a bead unit was $5 \times 10^5$ ohms, but at 570° C. the resistance had dropped to about 35 ohms. This decrease in resistance is about $10^4$ ohms below that of undoped $PbO \cdot PbCrO_4$ at both temperatures.

EXAMPLE II (A) A single crystal of $PbO \cdot PbCrO_4$, grown by pulling from the melt, was cleaved into thin slices in the thickness range 0.5 to 1.0 mm. and small rectangular pieces of about 1–2 $mm.^2$ were mechanically clamped between two pieces of .001" gold foil which served as electrodes. Upon application of heat to the crystal, a marked decrease in resistance from a room temperature value of about $10^{10}$ ohms was noted in each case and the effect was reversible and reproducible upon cooling and heating, respectively.

When the sample was placed in a furnace with a thermocouple and resistance measurements taken at different temperature, a curve of the type shown in Curve C of FIG. 1 was obtained. It was found that an aging treatment of about 15 hours in the range 500–550° C. was effective in increasing the reproducibility of the results. Because of their intrinsic homogeneity and greater perfection compared to the polycrystalline beads, the single crystal thermistor units are more stable than the solidified beads.

(B) A single crystal of $PbO \cdot PbCrO_4$ was coated with a vapor deposited film of chromium metal overlaid by vapor deposited gold in order to provide an electrical contact. Measurements of resistance versus temperature after attaching conducting lead wires to the vapor deposited metal layers showed the same negative temperature coefficient behavior previously described.

(C) Gold electrodes were attached to a single crystal of $PbO \cdot PbCrO_4$ by a soldering method using a 93 Au-7 Ge (wt. percent) alloy preform as the solder between electrode and crystal. The electrodes, preform and crystal were stacked in the proper sequence vertically on a support rod and clamped together in a furnace. Heating to 700° C. for a few minutes resulted in good electrical contacts. When the resistance of this type of unit was measured as a function of temperature, the same negative temperature coefficient behavior found for mechanical contacts on single crystals and for polycrystalline beads on wires was observed.

EXAMPLE III $PbO \cdot PbMoO_4$ was mixed in varying proportions with $PbO \cdot PbCrO_4$ and thermistors prepared from single crystal elements were made as described in Example II(A). The compositions of the mixtures in mole percent is set forth in the table below.

| | $PbO \cdot PbCrO_4$, percent | $PbO \cdot PbMoO_4$, percent |
|---|---|---|
| Composition: | | |
| A | 0 | 100 |
| B | 20 | 80 |
| C | 0 | 100 |
| D | 40 | 60 |
| E | 80 | 20 |
| F | 40 | 60 |

The resistance versus temperature data are shown in the curves of FIG. 1.

EXAMPLE IV

Following the procedure of Example IIA, a single crystal thermistor was made from $Nd_2O_3$-doped $PbO \cdot PbCrO_4$. A mixture of 37.755 grams of PbO, 54.672 grams of $PbCrO_4$ and 0.2861 gram of $Nd_2O_3$ (99.5 mole percent $PbO \cdot PbCrO_4$:0.5 mole percent $Nd_2O_3$) was melted in a platinum crucible and by crystal pulling techniques a large single crystal was grown. This crystal was cleaved into thin slices about 0.5 to 1.0 mm. in thickness. From these slices small area plates (about 4–9 mm.$^2$) were sawed or broken out. Electrodes were attached to these slices either by mechanical means, or by vapor deposition techniques. The electrical resistance as a function of temperature was measured using a calibrated vacuum tube voltmeter by inserting the electroded crystal unit into a controlled furnace with an appropriate temperature measuring device such as a thermocouple. The results are shown in Curve G of FIG. 2 and a resistance lowering of about 4 orders of magnitude was found for the doped material compared to the undoped $PbO \cdot PbCrO_4$ shown in Curve C of FIG. 1.

EXAMPLE V

Following the procedure of Example II(A), a single crystal was pulled from the melt of a mixture of 37.927 grams of PbO, 54.920 grams of $PbCrO_4$ and 0.0286 gram of $Nd_2O_3$ (equivalent to 99.95 mole percent of $$PbO \cdot PbCrO_4$$

and 0.05 mole percent $Nd_2O_3$). The crystal was cleaved into slices of about 0.5 to 1.0 mm. thickness and about 4–9 mm.$^2$ area. Electrodes were attached to opposite sides of the plate-like crystal and the entire assemblage was placed in a furnace. The single crystal unit was aged at 550° C. for 18 h. Measurements of the resistance of the crystal as a function of temperature were made with a vacuum tube voltmeter and calibrated against known resistances prior to each measurement. The room temperature resistance was about $10^5$ ohms which is about four orders of magnitude lower than the room temperature resistance of undoped $PbO \cdot PbCrO_4$.

EXAMPLES VI-X

Following the procedure of Example I, various doped polycrystalline thermistors were prepared. The composition in mole percent and the results in terms of resistances (ohms) at elevated temperatures and at room temperature are set forth in the table below:

| Example | $PbO \cdot PbCrO_4$, percent | $M_2O_3$ | $\Omega$ (575° C.) | $\Omega$ (R.T) |
|---|---|---|---|---|
| VI | 99.5 | 0.5% $Sc_2O_3$ | $2.2 \times 10^3$ | $2.2 \times 10^5$ |
| VII | 99.5 | 0.5% $Y_2O_3$ | $2 \times 10^3$ | $7 \times 10^5$ |
| VIII | 99.5 | 0.5% $Er_2O_3$ | $2 \times 10^3$ | $8 \times 10^5$ |
| IX | 99.5 | 0.5% $Eu_2O_3$ | $1.3 \times 10^3$ | $4.5 \times 10^5$ |
| X | 100 | None | $1.2 \times 10^6$ | $7 \times 10^8$ |

This data indicates that doping a $PbO \cdot PbCrO_4$ element with a compound of the formula $M_2O_3$ reduces the resistivity under isothermal conditions. However, it should be noted that the absolute values may change with various factors such as aging, size of the beads, spacing of lead wires, etc.

EXAMPLES XI-XV

Following the procedure of Example I, various doped $PbO \cdot PbMoO_4$ polycrystalline thermistors were prepared. The compositions in mole percent and the results in terms of the resistances (ohms) at elevated temperatures and room temperature are set forth in the table below.

| Example | $PbO \cdot PbMoO_4$, percent | $M_2O_3$ | $\Omega$ (575° C.) | $\Omega$ (R.T.) |
|---|---|---|---|---|
| XI | 99.5 | 0.5 $Nd_2O_3$ | $8 \times 10^4$ | $>10^9$ |
| XII | 99.0 | 1.0 $Nd_2O_3$ | $3.4 \times 10^4$ | $>10^9$ |
| XIII | 99.5 | 0.5 $Y_2O_3$ | $8 \times 10^4$ | $>10^9$ |
| XIV | 99.5 | 0.5 $Sc_2O_3$ | $1.7 \times 10^5$ | $>10^9$ |
| XV | 100 | None | $1.9 \times 10^6$ | $>10^9$ |

This data indicates that doping a $PbO \cdot PbMoO_4$ element with a compound of the formula $M_2O_1$ reduces the resistivity appreciably at elevated temperatures.

EXAMPLE XVI

Following the procedure of Example I, rare earth oxide doped $PbO \cdot PbSO_4$ polycrystalline elements were prepared. The compositions in mole percents and the results in terms of resistances (ohms) at elevated temperatures and room temperature are set forth in the table below.

| | $PbO \cdot PbSO_4$, percent | $Nd_2O_3$, percent | $\Omega$ (575° C.) | $\Omega$ (R.T.) |
|---|---|---|---|---|
| Sample: | | | | |
| A | 100 | None | $3 \times 10^6$ | |
| B | 99.5 | 0.5 | $3 \times 10^6$ | $>10^9$ |
| C | 99.0 | 1.0 | $2 \times 10^6$ | $>10^9$ |

These results indicate that the rare earth oxides do not appreciably lower the resistance of the $PbO \cdot PbSO_4$ element.

EXAMPLES XVII-XIX

Following the procedure of Example I, $Nd_2O_3$ doped mixtures of elements containing $PbO \cdot PbCrO_4$ and the Mo, S, and W analogs were prepared. The compositions in mole percent and the results in terms of ohms at elevated temperatures and room temperature are set forth in the table below.

| Example | $PbO \cdot PbZO_4$ | $Nd_2O_3$, percent | $\Omega$ (575° C.) | $\Omega$ (R.T.) |
|---|---|---|---|---|
| XVII | 100% ($2PbO \cdot PbCrO_4$-$3PbO \cdot PbMoO_4$) | None | $1.1 \times 10^5$ | $>10^9$ |
| | 99.5% ($2PbO \cdot PbCrO_4$-$3PbO \cdot PbMoO_4$) | 0.5 | $1.9 \times 10^3$ | $5 \times 10^8$ |
| XVIII | 100% ($2PbO \cdot PbCrO_4$-$3PbO \cdot PbSO_4$) | None | $4.2 \times 10^3$ | $5 \times 10^7$ |
| | 99.5% ($2PbO \cdot PbCrO_4$-$3PbO \cdot PbSO_4$) | 0.5 | $1.6 \times 10^3$ | $6 \times 10^8$ |
| XIX | 100% ($2PbO \cdot PbCrO_4$-$3PbO \cdot PbWO_4$) | None | $1 \times 10^4$ | $4 \times 10^7$ |
| | 99.5 ($2PbO \cdot PbCrO_4$-$3PbO \cdot PbWO_4$) | 0.5 | $9 \times 10^3$ | $>10^9$ |

These results indicate that the rare earth doping of mixtures of $PbO \cdot PbCrO_4$-$PbO \cdot PbMoO_4$ shows an appreciable decrease in the resistivity. On the other hand, no substantial decrease in resistivity was observed for the $PbO \cdot PbCrO_4$-$PbO \cdot PbSO_4$ or the $$PbO \cdot PbCrO_4\text{-}PbO \cdot PbWO_4$$

systems.

It will be appreciated that the invention is not limited to the specific details shown in the examples and illustrations and that various modifications may be made within the ordinary skill in the art without departing from the spirit and scope of the invention.

We claim:

1. A thermistor device having a negative coefficient of resistance comprising (a) a thermally sensitive semiconductor element of a material consisting essentially of a compound having the formula:

$$PbO \cdot PbZ''O_4$$

where $Z''$ is a member selected from the group consisting of Cr, Mo, and mixtures thereof, and 0.05–5.0 mole percent of an additive having the formula $M_2O_3$ wherein M is a member selected from the group consisting of scandium, yttrium, a rare earth element and mixtures thereof; and (b) at least two spaced conductors in electrical contact with said material.

2. The thermistor device of claim 1, wherein said compound is $PbO \cdot PbMoO_4$.

3. The thermistor device of claim 1, wherein said compound is a mixture of $PbO \cdot PbCrO_4$ and $PbO \cdot PbMoO_4$.

4. The thermistor device of claim 1, wherein said semiconducting element is in the form of a single crystal.

5. The thermistor device of claim 1, wherein said semiconducting element is a polycrystalline material.

6. The thermistor device of claim 1, wherein said semiconducting element is encapsulated in a protective material.

7. The thermistor device of claim 1, wherein said compound is $PbO \cdot PbCrO_4$.

8. The thermistor device of claim 7, wherein said additive is a rare earth oxide.

9. The thermistor device of claim 8, wherein the rare earth oxide is $La_2O_3$.

10. The thermistor device of claim 8, wherein the rare earth oxide is $Nd_2O_3$.

11. The thermistor device of claim 8, wherein the rare earth oxide is $Eu_2O_3$.

References Cited

UNITED STATES PATENTS

| | | | |
|---|---|---|---|
| 2,668,122 | 2/1954 | Pitrot | 106—298 |
| 2,700,720 | 1/1955 | Torok | 252—518 X |
| 3,231,522 | 1/1966 | Blodgett et al. | 252—521 |
| 3,490,067 | 1/1970 | Foex | 252—518 X |
| 3,637,532 | 1/1972 | Ramisch et al. | 338—22 X |

OTHER REFERENCES

"Rare Earths Number 15," Chemical and Engineering News, May 10, 1965, pp. 80–92.

Odin et al.: "X-ray Study of Lead-Monoxide—Lead Chromate System," Chemical Abstracts, vol. 68, pp. 2408:24875u (1968).

CHARLES E. VAN HORN, Primary Examiner

U.S. Cl. X.R.

29—612; 252—518; 338—22